United States Patent [19]

Butcher et al.

[11] Patent Number: 4,991,719

[45] Date of Patent: * Feb. 12, 1991

[54] METHOD AND APPARATUS FOR SORTING RANDOMLY POSITIONED ITEMS MINIMIZING SORTING CONVEYOR MOVEMENT

[75] Inventors: R. E. Butcher; A. A. Henderson, Jr., both of Houston, Tex.

[73] Assignee: Speed Sort, Inc., Houston, Tex.

[*] Notice: The portion of the term of this patent subsequent to Mar. 13, 2006 has been disclaimed.

[21] Appl. No.: 449,536

[22] Filed: Dec. 12, 1989

Related U.S. Application Data

[63] Continuation of Ser. No. 318,914, Mar. 3, 1989, Pat. No. 4,907,699.

[51] Int. Cl.⁵ .............................................. B07C 3/10
[52] U.S. Cl. ..................................... 209/3.3; 209/564; 209/583; 209/937; 198/349.95; 198/465.4; 364/478
[58] Field of Search ................. 209/3.1, 3.3, 539, 552, 209/564, 565, 566, 583, 937; 198/349.6, 349.95, 465.4; 211/1.5, 121, 122; 235/375; 364/478

[56] References Cited

U.S. PATENT DOCUMENTS

| 3,425,732 | 2/1969 | Reich ................................... 294/16 |
| 3,612,250 | 10/1971 | Thompson et al. .................. 209/3.3 |
| 3,915,284 | 10/1975 | Knockeart et al. .......... 198/349.6 X |
| 4,114,538 | 9/1978 | Nicodemus, Jr. et al. ............ 104/88 |
| 4,239,435 | 12/1980 | Weiss et al. ...................... 209/937 X |
| 4,907,699 | 3/1990 | Butcher et al. ...................... 209/3.3 |

FOREIGN PATENT DOCUMENTS

2164909 4/1986 United Kingdom ........... 198/349.95

Primary Examiner—Margaret A. Focarino
Assistant Examiner—Andrew C. Pike
Attorney, Agent, or Firm—Browning, Bushman, Anderson & Brookhart

[57] ABSTRACT

Improved methods and apparatus are provided for sorting and arranging garments in a selected order which have been sequentially placed in an unordered sequence. The garments are identified by a marking affixed to each garment, and each garment is arranged in its identified sequence on a sorting conveyor having a multiplicity of movable carriers each for receiving a garment. Identification signals are rearranged in a preselected order, and a plurality of arranged signals are assigned to each one of a corresponding plurality of pick-off mechanisms positioned along the sorting conveyor. A computer calculates bidirectional movement of the sorting conveyor to minimize conveyor movement for positioning a garment for pick-off in its proper sequence by a respective one of the pick-off mechanisms. The conveyor is driven in a bidirectional mode to properly position the garment, and a pick-off mechanism is activated to remove the garment from the sorting conveyor and position the garment on an unloading conveyor. Each conveyor pick-off apparatus includes a fluid-powered cylinder inclined downward toward the sorting conveyor, and a drive unit for closing the gripper mechanism. The method and apparatus of the present invention are particularly well suited for commercial laundry and industrial uniform rental plant industry, wherein commingled garments are arranged in a selected order for pickup or delivery to customers.

20 Claims, 3 Drawing Sheets

METHOD AND APPARATUS FOR SORTING RANDOMLY POSITIONED ITEMS MINIMIZING SORTING CONVEYOR MOVEMENT

This is a continuation of Application Ser. No. 07/318,914, filed Mar. 3, 1989, now U.S. Pat. No. 4,907,699, patented Mar. 13, 1990.

FIELD OF THE INVENTION

The present invention relates to techniques for sorting and arranging items randomly placed on a conveyor and, more particularly, relates to methods and apparatus for efficiently sorting and arranging garments on a sorting conveyor onto a plurality of unloading conveyors in a selected order determined prior to initiating the sorting process. The techniques of the present invention are well suited for applications in the commercial laundry and industrial uniform rental industry wherein commingled identifiable garments are washed and dried, then must be arranged in a selected order for pickup or delivery to customers.

BACKGROUND OF THE INVENTION

Various material handling techniques are widely used for removing devices from a conveyor system in a selected order. U.S. Pat. No. 3,612,250 discloses a recirculating conveyor system for distributing address coded packages to marshalling areas. U.S. Pat. No. 3,622,000 discloses a system for removing poultry within certain weight ranges from a conveyor line, and U.S. Pat. No. 3,880,298 discloses an endless loop conveyor with tiltable article carrying trays. Special material handling problems are encountered, however, for the efficient sorting and arranging of items randomly placed on a conveyor system for distribution in a preselected order at multiple output stations along the conveyor. The commercial laundry industry has long experienced this problem, since garments which are bulk cleaned and dried must be sorted and arranged in a selected order for pickup or delivery to customers. Significant problems are encountered in satisfying the requirements of this industry, as noted below.

U.S. Pat. No. 1,217,988 discloses one early prior art technique for sorting washed laundry. Laundry is tagged and placed on a conveyor which passes a plurality of collecting stations, and a particular garment is dropped from the conveyor to a selected station in response to a trip device. Other sorting and assembling apparatus is disclosed in U.S. Pat. Nos. 1,808,405, 1,808,406 and 2,362,638, although each of these systems is not practical since a collection station is required for each customer's items. U S. Pat. No. 4,114,538 discloses a power and free conveyor system for sorting garments, and U.S. Pat. No. 4,036,365 discloses a conveyor system wherein garments are identified then dropped at a station.

U.S. Pat. No. 4,239,435 is a more recent attempt to satisfy the requirements of the commercial laundry industry for sorting and arranging garments. According to the '435 Patent, garments randomly placed on a conveyor are releasably supported thereon as the conveyor moves along its closed loop path past a plurality of receiving stations. Each receiving station identifies each garment passing thereby, and a particular garment is released from the conveyor at a particular receiving station by a special releasing device, which is controlled by a rotary solenoid responsive to the garment identifying device. The apparatus used according to this patent is complex and expensive, and the technique disclosed in this patent has found little acceptance in the commercial laundry or the industrial uniform rental industry.

Most commercially cleaned garments include a conventional identification marking affixed thereon, or can be easily identified by such an identification tag temporarily secured to the garment. These garments are, however, almost universally sorted by a manual operation. Typically, garments are first manually sorted and placed on a selected conveyor from a group of conveyors which represents a particular route which serves various customers. Once garments have been sorted by route, the garments are then similarly manually sorted and placed on a particular conveyor from a second group of conveyors representing a particular customer's account. A third manual sorting operation is required to then manually sort all garments for that particular customer, so that garments for a particular employee will be arranged together, and preferably will be in a selected sequence with respect to garments for other employees of that customer. Finally, some customers wish to have the garments for each employee arranged in a preselected sequence, i.e., shirts first, slacks second, jackets third, so that additional manually sorting operations are required.

Although almost universally used, manual garment sorting as described above has a number of significant drawbacks. First, the accuracy of any manual sorting procedure is a function of human frailties, which in turn means that sorting accuracy is influenced by considerations outside of the control of the commercial laundry employer. Extremely high sorting accuracy is required, since the cost of replacing one cleaned garment improperly sorted and delivered to the wrong customer can practically offset the profits otherwise realized by the commercial laundry for cleaning and properly sorting one hundred other garments. Apart from garment replacement costs, the goodwill of the laundry is directly connected to returning the proper garments to each customer or its employee. Second, manual sorting of garments is labor intensive and thus expensive. Moreover, in view of the number of repeated sorting operations and the multiplicity of conveyors required for each sorting operation, a good deal of floor space is required to perform the manual sorting operation. Manual sorting of garments, by its very nature, does not allow for a high level of control by the commercial laundry establishment, does not provide the laundry or its customers with desired data useful for various management reports, and is both expensive and unreliable.

Another problem with automated sorting of laundered garments concerns the reliability of retrieving the selected garment from a conveyor system at a desired time and location. Individual garments are commonly placed on individual metal wire hangers which are supported on the conveyor, and particular hangers are thus removed from the conveyor system to release the garment. According to the techniques disclosed in U.S. Pat. No. 4,239,435, each hanger is releasably supported on the conveyor system, and a carrier assembly with a swingable latch member releases a hanger to allow the hanger and garment to fall by gravity onto a guide bar. One of the primary reasons that this technique has not been widely accepted in the industrial uniform rental industry relates to the system's mechanically complex technique for removing garments from the conveyor. Other prior art devices for selectively gripping an object are disclosed in U.S. Pat. Nos. 3,425,732, 4,537,557, and 4,595,333. The systems disclosed in these patents are not, however, well-suited for gripping a metal wire hanger supporting a garment.

Reliance upon frictional engagement of a metal wire hanger with a gripper member used to remove a hanger and garment from a conveyor is not preferred, because the hanger may slip out of the gripper due to insufficient holding force. The required frictional holding force is a function of varying inertia forces resulting from starting and stopping movements of the garment, and varying loads caused by different garment weights. Moreover, increasing the frictional gripping force on a garment hanger increases maintenance due to increased stress forces, and can damage or break the hanger.

The disadvantages of the prior art are overcome by the present invention, and improved methods and apparatus are hereinafter disclosed for efficiently sorting and arranging items, and particularly clothing garments supported by hangers, carried by and randomly positioned on a conveyor system.

SUMMARY OF THE INVENTION

The techniques of the present invention are well suited for the industrial garment cleaning or uniform rental industry. Garments assigned to various employees of various companies are commonly commingled for efficient cleaning and drying. Each garment includes an identification tag, which may be permanently sewn therein or temporarily affixed thereto by the cleaner. Garments are placed on hangers and randomly input onto a feeding conveyor, where the garments pass a garment identification station. An operator identifies the garment by passing a laser scanner by the identification tag. Identification information of the sequentially scanned garments is input to a temporary data storage device, and each garment is sequentially loaded onto a sorting conveyor having a multiplicity of carriers. Accordingly, the temporary data storage device records the identification of each garment assigned to a respective carrier.

Data from the temporary data storage device is transferred to a computer once a group of garments are input into the sorting conveyor, such that a new group of garments may be scanned while the first group is sorted. The garment identification numbers are arranged by the computer into a proper sequential order so that each carrier (or slot number representing a carrier) is arranged in its preselected sequence. The computer then divides the number of garments in the group based on the number of available pick-off mechanisms which are situated along the sorting conveyor, so that a plurality of specific garments, or slot numbers, in a specific and desired order, are assigned to each pick-off mechanism. The sorting conveyor is driven by a stepping motor responsive to the computer, and is homed so that a specific slot is in a preselected starting location. The computer then calculates the shortest move between the starting position of the conveyor and its position so that one of the pick-off members can sequentially retrieve the garment corresponding to its first rearranged identification number from the conveyor. The conveyor is driven by the stepping motor in a bi-directional mode. When the selected garment is in its proper position with respect to its assigned pick-off mechanism, the mechanism is activated to retrieve the garment from the conveyor and place the garment on an unloading conveyor associated with that pick-off mechanism. The calculation of the shortest conveyor movement from the first position to the second position, and the activation of one of the pick-off mechanisms of the second position, is then performed. The process is repeated until the sorting conveyor is emptied of garments.

Each fluid-powered pick-off mechanism comprises a first cylinder for moving a gripper assembly toward and away from the sorting conveyor, and a second cylinder for pivotably closing a pair of biased open latch jaws. In their closed position, the latch jaws encircle a hook portion of the hanger, so that the hanger is positively retained by the gripper assembly until the latch jaws open to release the hanger and garment onto the unloading conveyor.

It is an object of the present invention to provide improved methods and apparatus for efficiently sorting randomly arranged items on a conveyor, each item having been identified and sequentially input into the conveyor. A plurality of pick-off mechanisms are activated in response to the ordered sequential rearrangement of the garments by a computer, so that garments will be retrieved from the conveyor in a sorted sequence and placed on the plurality of associated unloading conveyors. The bi-directional conveyor is driven in response to the computer, which calculates conveyor movement so that the conveyor is driven to position the next garment by its associated pick-off mechanism to minimize overall conveyor movement and increase sorting efficiency.

It is a feature of the present invention to provide improved techniques for sorting garments identified by a marking or code affixed to each garment. Randomly arranged garments are identified as they are input into the conveyor, so that each sequentially input garment is assigned a specific carrier or slot number on the conveyor. Each garment is supported on a hanger, and the hanger and garment are removed from the conveyor by one of a plurality of pick-off mechanisms associated with each unloading conveyor.

It is an advantage of the present invention that each of the pick-off mechanisms are fluid-powered, and comprise a first cylinder for moving a gripping assembly toward and away from the conveyor, and a second cylinder for pivotably closing a pair of latch jaws. In the closed position, the latch jaws encircle the upper portion of the hanger, and are moved to the opened position to release the hanger onto the unloading conveyor.

It is a further object of the present invention to provide a highly reliable yet relatively low-cost technique utilizing a computer for sorting randomly arranged garments on a conveyor in a commercial laundry facility, wherein the output of the computer provides valuable data for various types of management reports.

These and further objects, features and advantages of the present invention become apparent from the following detailed description, wherein reference is made to the figures in the accompanying drawings.

DETAILED DESCRIPTION OF PREFERRED EMBODIMENTS

Figure 1:
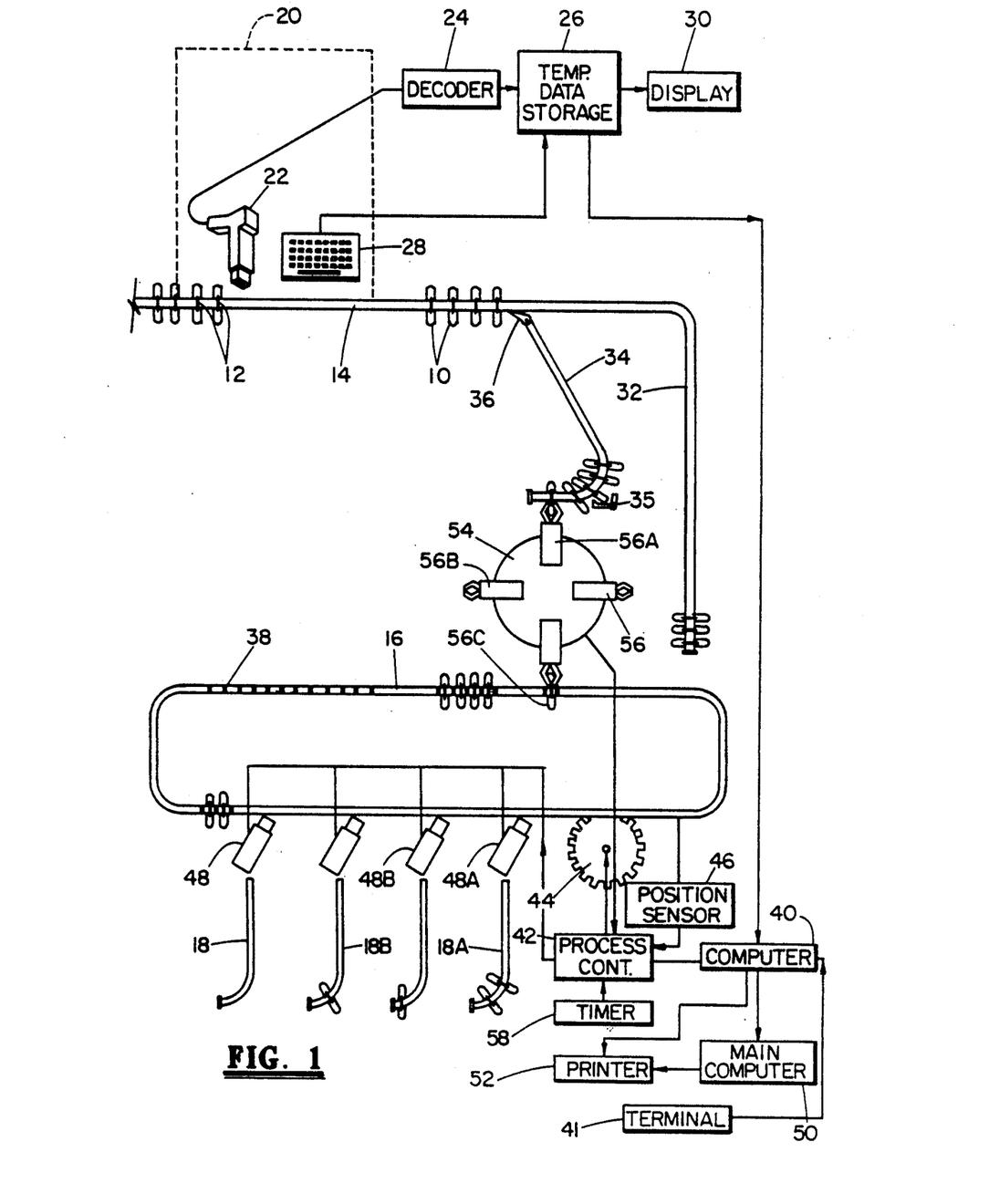
FIG. 1 is a simplified pictorial view of the garment sorting apparatus according to the present invention.

FIG. 1 generally depicts the garment sorting assembly according to the present invention for use in a commercial laundry facility. For explanation purposes, it will be presumed that garments of various types from numerous customers or accounts are commingled for efficient cleaning, drying, pressing, etc. Thus slacks, shirts, and/or coats assigned to various employees of each customer are randomly arranged on individual hangers, i.e., in an unordered sequence, and are sorted and arranged in a preselected sequence by the techniques of the present invention. Each garment typically will be supported on its own hanger, and will include a bar code identification marking or tag permanently sewn, heat sealed, or otherwise secured to the garment at a suitable location, i.e., the neck band of shirts and coats, and the waist band of slacks. It should be understood that the term "identification tag" as used herein includes both a physical tag with an identification marking thereon, or an identification marking fixed on the material of the garment itself. Garments not provided with a permanently affixed tag may have a suitable tag temporarily affixed thereto by the laundry facility. For purposes of this discussion, it will be presumed that the garment is identified by both a twelve digit bar code and a corresponding numeric code, such that the bar code can be automatically read by a scanner, and the numerical code can be manually read by an operator.

Each of the garments 10 shown in FIG. 1 is placed on a corresponding metal hanger 12 subsequent to cleaning, drying, pressing, etc., and each garment remains on that hanger during the sorting process and until the garment is removed by the employee to which that garment is assigned. The assembly as shown in FIG. 1 includes a garment identification conveyor 14, a closed-loop sorting conveyor 16, and a plurality of unloading conveyors 18. Both the identification conveyor 14 and the unloading conveyors 18 need not be powered, and may be slick rail conveyors wherein the garments move along the fixed conveyor rail by gravity.

The garments 10 will thus be in an unordered sequence on the conveyor 14. Each garment is identified at identification station 20, where a garment identification tag may be automatically or manually read. Preferably, the garment is automatically identified by a portable helium-neon laser scanner 22 of the type commonly used to identify bar-coded objects, with the operator merely aiming the scanner sequentially at the garment identification tags as they move along the conveyor 14. The coded signal from the scanner 22 may be decoded at 24, and is input as an electronic identification signal to a conventional temporary data storage device 26. Alternatively, an operator may visually read the numeric code on the identification tag, and type the identifying information into terminal 28, which then transmits the identification signal to storage device 26. Once the identification information is input to device 26, it may simultaneously be displayed on screen 30 so that the operator can verify the input information. The device 26 thus sequentially receives a series of electronic signals corresponding to the identification tag numbers, i.e., 596384691207, 861458396180, 304581329457, etc. The garments then continue along the conveyor 14 in the sequence in which they were identified, and are transported to either a manual unloading conveyor 32 or an automatic unloading conveyor 34, as a function of the position of switch 36.

For illustration purposes and with reference to the first identified garment, it will be presumed that the first two digits, 59, represent a specific distribution route, i.e., the assigned route number for subsequently delivering that garment and other garments to customers in the same general area. The next four digits, 6384, designate by number a specific customer or account within that route. The next three digits, 691, represent a specific employee of the identified account, i.e., Robin Jones. The next digit, 2, represents a selected sort order, e.g. indicates that all of Mr. Jones's shirts should be arranged sequentially first, followed by all of his slacks and then his coats. The last two digits, 07, serialize individual garments, i.e., this particular garment is the seventh garment issued to Mr. Jones. These identification codes allow the techniques of the present invention to generate a great deal of information useful to management for both the customer and the laundry facility, as explained hereafter.

Once the garments 10 have been sequentially identified and positioned on the loading conveyor 32, the garments may be sequentially manually loaded onto the sorting conveyor 16, which has a series of numbered or otherwise visually identifiable carriers 38 thereon. Before loading the sorting conveyor, however, a specific carrier is assigned to each sequentially input garment. In other words, the operator would typically place the first garment previously identified as 596384691207 on carrier No. 1, the second garment on carrier No. 2, etc. Since the carrier number for any carrier on the conveyor 16 remains the same as the conveyor moves, the garment can then be identified by the carrier number on which it is placed and the information in the temporary data storage device 26.

As the garments are loaded onto the sorting conveyor 16, data from the storage device 26 may be dumped to computer 40. This feature allows one group of garments, typically approximately 1,200 garments, to be loaded onto the sorting conveyor 16 and unloaded therefrom (as explained hereafter), while a second group of garments is identified and data from these garments sequentially retained in device 26. The computer 40 associates a particular identification number with a specific carrier, since it is preprogrammed that the first garment is on carrier No. 1, the second garment on carrier No. 2, etc., as previously noted. Alternatively, the operator may input to the computer the designated carrier number for the first garment and the movement of the conveyor 16 as it is loaded. In either event, the computer 40 continually associates a particular garment identification number with a particular carrier, and that association remains fixed for each batch of garments sorted.

The computer 40 performs a plurality of operations. At terminal 41, the operator inputs a selected sorting sequence, i.e., instructs the computer 40 to sort all garments in a decending route number order, then an ascending account number order, etc. The computer 40 then effectively rearranges the identification garment numbers in the desired sequence order, so that the associated carrier numbers will be rearranged in an order corresponding to the desired sorting sequence for the garments, i.e., carrier numbers rearranged as 238, 054, 306, etc. The computer then divides the rearranged garment identification numbers (or carrier numbers) between the available pick-off mechanisms. Accordingly, the first 250 garments in the rearranged order corresponding to designated carrier numbers may be assigned to pick-off mechanism 48A, the second 250 garment identification numbers may be assigned to pick-off mechanism 48B, etc. In making this division, the computer can be easily instructed so that a specific route number, account number, or employee number will not be split between two pick-off mechanisms.

A process controller 42 may then actuate a sorting conveyor drive 44 to "home" the conveyor, i.e., place a designated carrier (carrier No. 1) at a designated starting position. The computer then calculates the required conveyor movement, in both directions, necessary to position the carrier representing the first identification number in each sorted sequence for removal by its respective pick-off mechanism. For the assembly as shown in FIG. 1 having four pick-off mechanisms, the computer 40 may thus make eight calculations of the distance the conveyor must move to properly position the next carrier for garment pick-off according to the rearranged order by each of the four pick-off mechanisms. According to one embodiment, the computer then selects the shortest conveyor movement distance and direction, and the process controller in response thereto causes the conveyor drive 44 to move the conveyor 16 the selected distance in the selected direction. Once the conveyor has moved to its selected position, the sorting conveyor is stopped, and the garment is picked off the conveyor. The above process is then repeated, and eight new conveyor movement calculations are then made by the computer 40, each based on the starting point resulting from the previous conveyor movement, so that the next carrier will be properly positioned for garment pick-off according to the rearranged order. If a particular pick-off mechanism was not activated, its next garment identification number remains unchanged. Once a pick-off mechanism is activated to remove a specific garment representing the first identification number in the rearranged order assigned to that mechanism, the computer will then calculate the required bidirectional conveyor movement to pick-off the garment corresponding to the second rearranged identification number assigned to that mechanism. In this manner, all of the garments may be efficiently removed from the sorting conveyor and arranged in their desired sequence on a selected one of the unloading conveyors 18.

Still referring to FIG. 1, various modifications of the techniques described above are within the scope of the present invention. Instead of being manually loaded, the garments may be automatically placed sequentially from the loading conveyor 34 onto the sorting conveyor 16 by fluid-powered automatic loading device 54. Loading device 54 includes four pick-off mechanisms 56 each substantially similar to pick-off mechanisms 48 associated with unloading of the conveyor 16. Each of the mechanisms 56 are circumferentially arranged about a carousel which, as shown in FIG. 1, rotates in a counterclockwise direction. Mechanism 56A thus picks off the last garment on the conveyor 34, while mechanism 56C automatically inputs a garment onto the sorting conveyor 16. At the location of mechanism 56B the garment may optionally be identified, and accordingly the station 20 previously discussed may be positioned between the loading conveyor 34 and the sorting conveyor 56. Rotational movement of the automatic loader 54 may trigger switch 35, thereby allowing one garment in a series of sequential garments on the slick rail conveyor 34 to be positioned for pick-off by the mechanism 56.

As indicated in FIG. 1, the process controller 42 may be used to activate rotation of the automatic loader, so that the conveyor drive 44 may move the conveyor one slot or carrier forward, and the mechanism 56 then activated to sequentially load another garment onto the sorting conveyor. Alternatively, a timer 58 may be provided for activating both the sorting conveyor and the automatic loader at a selected interval. When the sorting conveyor is moved a selected distance, the conveyor drive 44 will stop, and may transmit a completed conveyor movement signal back to the process controller to verify that the conveyor has, in fact, moved in the desired direction and amount. Alternatively, the conveyor position sensors 46 directly responsive to movement of the carriers on the conveyor may be used for transmitting a similar signal back to the process controller, so that a verified conveyor movement signal may be received prior to initiating any subsequent conveyor movements. Although not shown in FIG. 1, a similar conveyor drive, process controller, timer, and sensor may be used to drive the identifying conveyor 14, so that the incremental movement of the identifying conveyor will be based on the transmission of an identifying signal to the temporary data storage device 26. While various devices may be used to drive the sorting conveyor 16, suitable driving devices are an electrically-powered stepper motor or a hydraulically-powered drive motor.

As previously indicated, the process controller 42 will also activate a selected one of the pick-off mechanisms 48 when the garment associated with the next identification number in the rearranged sequence for that pick-off mechanism is properly positioned along the conveyor. Actuation of any pick-off mechanism will thus allow the computer to calculate the next required conveyor movement to pick-off the garment representing the next identification number in the rearranged sequence for that mechanism. As each garment is picked off the conveyor, it is deposited on the slick rail conveyor 18 associated with that pick-off mechanism.

It is possible that two garments may be simultaneously positioned at one conveyor position for pick-off by their respective pick-off mechanisms, in which case the computer may be programmed to actuate each of the mechanisms 48 simultaneously. Also, the computer 40 need not be responsive to a certain identification number, such as the last two digits of the twelve digit code. Accordingly, three shirts each assigned to Robin Jones may have the same route number, account number, employee number and sorting order number. If these three shirts are on the same sorting conveyor, the computer may calculate the shortest conveyor movement required to pick-off any one of these shirts by its assigned pick-off mechanism. Also, it should be understood that the computer 40 may be programmed to minimize conveyor movement and enhance sorting efficiency by taking into consideration more than one conveyor movement at a time. By way of example, the computer may "look ahead" and recognize that a conveyor movement of twenty spaces in the clockwise direction to unload one garment followed by further clockwise movement of one space to unload two garments may be more efficient than permitting counterclockwise conveyor movement of eighteen spaces to unload one garment followed by further counterclockwise movement of four spaces to unload the next garment and eight spaces to unload the next garment.

According to the present invention, it is significant that data fed into the computer 40 may be used for additional purposes other than for sorting the garments. The computer 40 may alone, or in conjunction with a main computer 50, generate various types of management reports, which may be then output on printer 52. Since the identification number and sorting information is fed into the computer to perform sorting, it may be easily used to generate garment inventory reports, production cleaning reports, sorting efficiency reports, down-time reports, etc. for management of the cleaning establishment. In addition, this data allows management to easily generate reports or analyses based upon various route numbers, particular customers, particular employees, etc. to maximize efficiency and increase profitability. Finally, similar reports may be made available by the laundry facility to the customer, so that the customer can easily discern which employee's garments are being washed at certain times, how many times any particular garment of any particular employee is cleaned, which employees have too few assigned garments, etc.. This is a significant feature of the present invention, since the effort required to input data to sort garments according to the present invention is used to generate these valuable reports.

Figure 2:
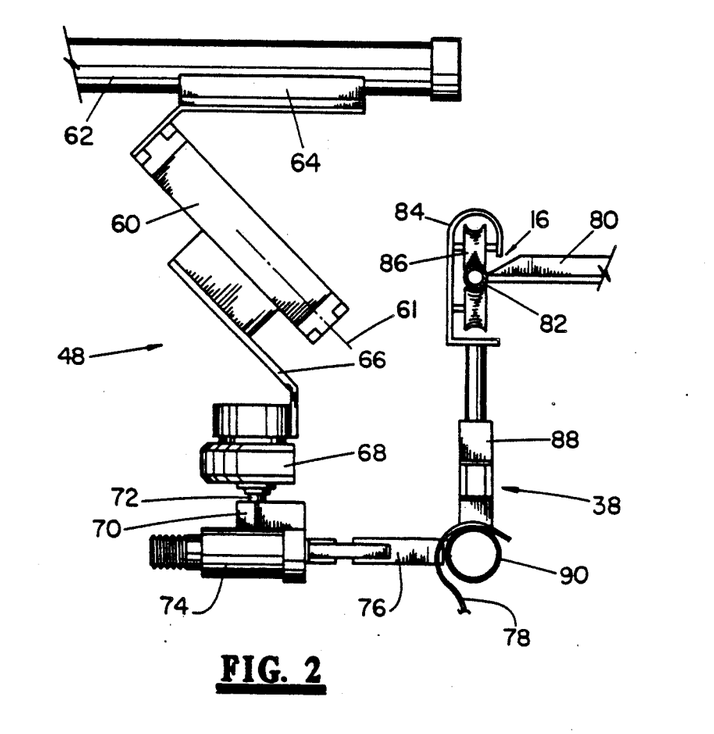
FIG. 2 is a side view of one of the pick-off mechanisms generally shown in FIG. 1.
Figure 3:
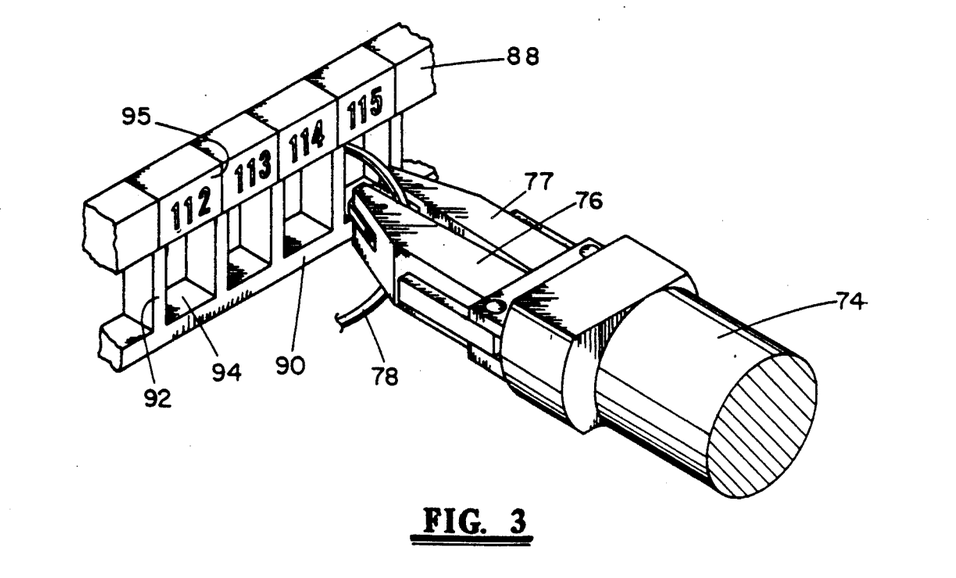
FIG. 3 is a pictorial view of the gripper assembly generally shown in FIG. 2 in its closed position about a hanger.

Referring now to FIG. 2, a suitable pick-off mechanism 48 is shown in greater detail for removing the garment and hanger from the sorting conveyor 16 and depositing the garment and hanger on a unloading conveyor associated therewith. The sorting conveyor 16 includes a fixed tubular rail 82 supported on a structural steel member 80. A plurality of carrier supports 84 are each positioned about the fixed rail 82 by a pair of guide rollers 86, so that intermittently spaced carrier supports carry a plurality of carriers 38 therebetween. The carriers include an upper portion 88 and a lower tubular portion 90, as shown in FIG. 3. The hook end 78 of each garment hanger 12 thus is hooked over tubular portion 90 in a conventional fashion.

The pick-off mechanism includes a fluid-powered cylinder 60 having an axis 61 projecting downward toward the conveyor 16 and inclined at an angle of less than about 60°, and preferably about 45°, with respect to a vertical plane formed by the garments passing by the pick-off mechanism. Cylinder 62 has an outer housing which is structurally fixed, and guide member 64 is secured to a rod member thereof. Cylinder 62 thus reciprocates along a substantially horizontal axis. Cylinder 60 is supported from cylinder 62, and a bracket 66 is effectively connected to a rod end of this cylinder 60, so that actuation of the cylinder 60 moves the bracket 66 toward and away from the conveyor 16 and the hanger thereon. A rotary drive unit 68 is suspended from bracket 66, and block 70, gripper drive unit 74, and gripping assembly 76 rotate about shaft 72 in response to the rotary drive unit 68.

When the pick-off mechanism 48 is activated, the gripper assembly 76 is preferably biased in an open position thereof and rotary drive unit 68 positions the apparatus as shown in FIG. 2. Cylinder 60 may then cause the gripping assembly 76 to move toward the hanger in the direction of the axis 61. Once positioned, unit 74 is activated to cause the gripping assembly to grasp or pick the hanger. Cylinder 60 is then retracted to move vertically up and horizontally away from the sorting conveyor 16, such that the garment and hanger are effectively picked off the conveyor without necessitating any movement of conveyor components.

Once picked off the conveyor, the cylinder 62 may be activated to move the pick-off gripping assembly and garment horizontally a substantial distance, e.g., three to five feet, from the sorting conveyor. Since the picked garment and hanger no longer interfere with the subsequent movement of other garments along the conveyor, the drive 44 may then be activated. Motor 68 may then be activated to rotate shaft 72 90°, and the unit 74 then activated to release the hanger and picked garment onto the slick rail 18 associated with that pick-off mechanism. Once the garment has been released by the pick-off mechanism 48, the cylinder 62 may return to its starting position and the drive unit 68 activated to return the pick-off mechanism to the position shown in FIG. 2.

Figure 4:
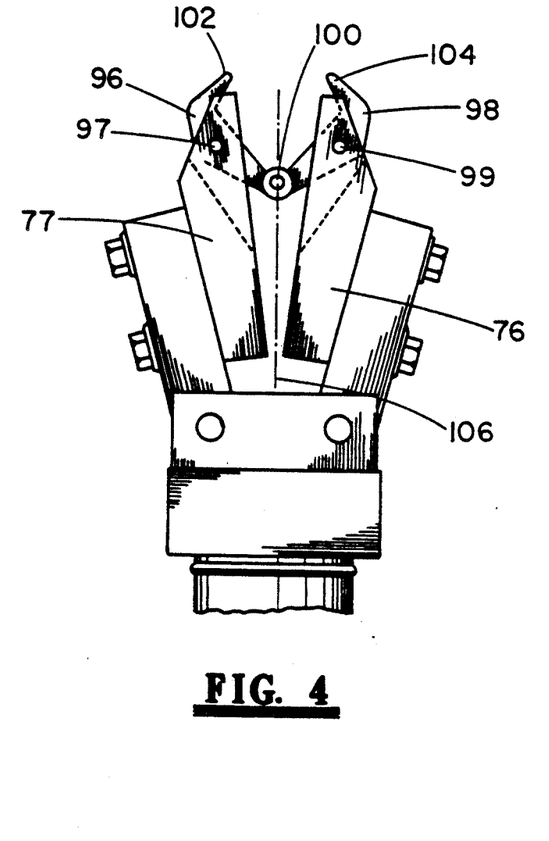
FIG. 4 is a top view of a portion of the gripper assembly generally shown in FIG. 3 in its open position.

Referring now to FIGS. 3 and 4, the gripper mechanism 76 and its associated drive unit 74 are shown in greater detail. The hook end 78 of each hanger is positioned within a numbered slot 94 defined by a pair of spaced vertical bars 92, a hanger supporting tubular portion 90 at a lower end of each bar, and a carrier identification strip 95 on the upper portion 88. A multiplicity of visually identifiable carriers thus move in a conventional fashion between the pick-off mechanisms in response to the conveyor drive unit 44. While it is preferable that each carrier formed by the above components is structurally interconnected, physically separate carriers each interconnected to a common conveyor chain or other flexible drive means may be provided. It is important to the concepts of the present invention, however, that the sorting conveyor include a multiplicity of movable carriers each associated with a particular hanger for supporting a previously identified garment thereon. By associating the carrier and the identification signal for the garment, identification signals may be rearranged as previously explained and each carrier then positioned with respect to its respective pick-off mechanism for sorting and arranging the garments in the preselected order on each of the plurality of unloading conveyors 18.

Referring to FIG. 4, two fingers 76, 77 of the gripper assembly are thus positioned and remain on opposite sides of a centerline 106 of the assembly. A pair of latch jaws 96, 98 are each pivotally connected by respective pins 97, 99 to one of these fingers 76, 77, and are pivotally connected to each other by pin 100. In an open position, as shown in FIG. 4, terminal ends 102, 104 of the jaws define an open throat for receiving the hanger, as previously explained. When the jaws close, however, the terminal ends overlap (see FIG. 3) such that the hanger is positively picked. While the interior surfaces of the latch jaws 96, 98 preferably contact the hanger during this gripping operation, the jaws fully encircle the hanger when in their closed position, so that the hook portion of the hanger prevents the hanger from inadvertently dropping from the pick-off mechanism even if sliding movement of the hanger with respect to the inner surfaces of the jaws occurs. In addition to encircling and thus positively gripping the hanger, a further advantage of the pick-off mechanism with the latch jaws as shown in FIG. 4 is that the jaws 96, 98 close at a faster rate than the fingers 76, 77. Accordingly, the terminal ends 102, 104 of the jaws will close and begin to overlap before both the fingers 76, 77 or the inner surfaces of the jaws grip the hanger.

Various changes and modification of the methods and apparatus as described above may be made without departing from the spirit and scope of the present invention. For example, the temporary data storage device, computer and process controller may be a single stand alone unit, with the data storage device and computer consisting of conventional microchips, and the process controller responding to their output signals to generate control signals to the conveyor drive unit, pick-off mechanism, and automatic loader. A more complex technique for detecting the difference between actual conveyor movement and computer conveyor movement may be used to verify that the sorting conveyor is in its desired position, such as the system disclosed in U.S. Pat. No. 3,396,946. Also, devices other than a helium-neon laser may be used for assisting in the identification of garments. A RF frequency scanner or other type of conventional bar code scanner may be used for generating the identification signals for each garment and sequentially passing these signals to the temporary data storage device. Although in the system described above only one garment is supported on one hanger which is then positioned in one slot, a plurality of garments could be positioned on the same hanger and/or a plurality of hangers may be bundled as a group, provided that the identification of one of the garments is sufficient to enable sorting according to the present invention of all the garments grouped together with the one identification tag.

The pick-off mechanism 48 as disclosed herein is similar to prior art pick-off mechanisms, such as the Tom Eracon brand pick-off mechanism. The primary differences relate to the orientation of the cylinder 60 with respect to the garment sorting conveyor 16, and the use of special latch jaws as disclosed herein. It should be understood that the latch jaws may be biased closed and opened by the drive unit associated therewith, or may be both opened and closed by the associated drive unit. The sorting conveyor as described herein is similar to prior art conveyors used in the laundry industry. A suitable conveyor according to the present invention is the Airlift-type conveyor fabricated by Speed Check, Inc. in Atlanta, Ga.

Other alternative forms of the present invention will suggest themselves from the consideration of the apparatus and methods described herein. Accordingly, it should be understood that the methods and apparatus as described herein and as shown in the accompanying drawings are intended as exemplary embodiments of the present invention, and not as limitations thereto.

What is claimed is:

1. A method of sorting items in a preselected order each having an identifying marking and arranged in an unordered sequence prior to sorting, the method comprising:
   (a) identifying each item in the unordered sequence from the identifying marking and outputting identification signals in response thereto;
   (b) arranging each item on a sorting conveyor having a multiplicity of movable carriers each for receiving a respective item thereon;
   (c) arranging the identification signals such that each of the identification signals is positioned between other identification signals in the preselected order;
   (d) assigning a plurality of arranged identification signals to each one of the corresponding plurality of unloading mechanisms positioned along the sorting conveyor;
   (e) positioning the sorting conveyor such that a selected carrier on the sorting conveyor is at a selected position;
   (f) calculating bidirectional movement of the sorting conveyor to each of a plurality of potential first positions such that in each of the potential first positions an item respresentative of a first identification signal in each of the plurality of arranged identification signals will be positioned for unloading by the respective unloading mechanism thereof;
   (g) selecting one of the calculated movements which is preferred over the other calculated movements to unload the items from the sorting conveyor;
   (h) driving the sorting conveyor a fixed distance in a selected direction in response to the selected calculated movement; and
   (i) activating the respective unloading mechanism to remove the item positioned for unloading from the sorting conveyor.

2. The method as defined in claim 1, further comprising:
   inputting each identification signal into a data storage device; and
   calculating said bidirectional movement of the sorting conveyor for one group of items while a second group of items is identified and identification signals are input to the data storage device.

3. The method as defined in claim 1, further comprising:
   repeating steps (f) through (i) for successive conveyor positions, wherein successive calculated conveyor movements are based upon the position of the sorting conveyor bidirectionally driven as a result of the preceding conveyor movement.

4. The method as defined in claim 1, wherein:
   step (i) includes releasing the item from the unloading mechanism onto an unloading conveyor associated therewith.

5. The method as defined in claim 1, wherein step (g) is performed by selecting the shortest calculated movement required to position the item representative of the first identification signal for pick-off by the respective unloading mechanism thereof.

6. The method as defined in claim 1, further comprising:
   monitoring conveyor movement in response to step (h);
   generating an unloading signal when the sorting conveyor has been driven the fixed distance in the selected direction; and
   thereafter activating the respective unloading mechanism in response to the unloading signal.

7. The method as defined in claim 1, further comprising:
   assigning a visually identifiable and sequential carrier designation to each of the identification signals, each carrier designation representing the carrier which sequentially receives the item associated with that identification signal; and
   connecting each carrier designation with a respective identification signal such that the carrier designation is arranged with the identification signals.

8. The method as defined in claim 7, wherein step (i) includes releasing the item from the unloading mechanism onto an unloading conveyor associated therewith.

9. The method as defined in claim 1, wherein step (a) includes scanning each identifying marking with a laser scanner.

10. The method as defined in claim 9, further comprising:
placing the items in the unordered sequence on an item identification conveyor while performing step (a); and
driving the item identification conveyor in response to the generation of identification signals form the laser scanner.

11. A method of sorting items in a preselected order each having an identifying marking and arranged in an unordered sequence prior to sorting, the method comprising:
(a) scanning each identifying marking with a laser scanner and outputting identification signals in response thereto;
(b) arranging each item on a sorting conveyor having a multiplicity of movable carriers each for receiving a respective item thereon;
(c) arranging the identification signal such that each of the identification signals is positioned between other identification signals in the preselected order;
(d) assigning a plurality of arranged identification signals to each on of a corresponding plurality of unloading mechanisms positioned along the sorting conveyor;
(e) positioning the sorting conveyor such that a selected carrier on the sorting conveyor is at a selected position;
(f) calculating bidirectional movement of the sorting conveyor to each of a plurality of potential first positions such that in each of the potential first positions an item respresentative of a first identification signal in each of the plurality of arranged identification signals will be positioned for unloading by the respective unloading mechanism thereof;
(g) selecting one of the calculated movements which is preferred over the other calculated movements to unload the items from the sorting conveyor;
(h) driving the sorting conveyor a fixed distance in a selected direction in response to the selected calculated movement;
(i) activating the respective unloading mechanism to remove the item positioned for unloading from the sorting conveyor; and
(j) repeating steps (f) through (i) for successive conveyor positions, wherein successive calculated conveyor movements are based upon the position of the sorting conveyor bidirectionally driven as a result of the preceding conveyor movement.

12. The method as defined in claim 11, further comprising:
inputting each identification signal into a data storage device; and
calculating said bidirectional movement of the sorting conveyor for one group of items while a second group of items is identified and identification signals are input to the data storage device.

13. The method as defined in claim 11, wherein step (g) is performed by selecting the shortest calculated movement required to position the item representative of the first identification signal for unloading by the respective unloading mechanism thereof.

14. The method as defined in claim 11, further comprising:
monitoring conveyor movement in response to step (h);
generating an unloading signal when the sorting conveyor has been driven the fixed distance int he selected direction; and
thereafter activating the respective unloading mechanism in response to the unloading signal.

15. Apparatus for sorting and arranging items in a preselected order each having an identifying marking and arranged in an unordered sequence prior to sorting, the apparatus comprising:
identifying means for generating an identification signal in response to each identifying marking;
sorting conveyor means having movable carriers thereon each for sequentially receiving a respective identified item;
a plurality of unloading conveyor means each for receiving a plurality of items in a preselected order;
a plurality of unloading means each positioned along the sorting conveyor means for removing an item from the sorting conveyor means and positioning each removed item sequentially on a respective one of the unloading conveyor means;
computer means for receiving the identification signals, arranging the identification signals in a preselected order, assigning a plurality of arranged identification signals to each one of the corresponding plurality of unloading means, calculating bidirectional movement of the sorting conveyor means from a current position to each of the plurality of potential unloading positions such that the item representative of the next identification signal in each of a plurality of arranged identification signals is positioned for removal from the sorting conveyor means by the respective unloading means thereof, and selecting one of the calculated movements to minimize movement of the sorting conveyor means; and
drive means responsive to the computer means for causing bidirectional movement of the conveyor means in response to the selected calculated movement.

16. The apparatus as defined in claim 15, further comprising:
data storage means for receiving identification signals and subsequently transmitting the signals to the computer means, such that one group of items is identified and respective signals stored in the data storage means while another group of items is sorted by the unloading means and the computer means.

17. The apparatus as defined in claim 15, wherein the identification means is a laser scanner.

18. The apparatus as defined in claim 15, wherein the items on the sorting conveyor means move is a substantially vertical plane past each of the unloading means, and the unloading means comprises:
a gripper mechanism for clamping about an item supported on the sorting conveyor means;
a fluid-powered cylinder having a central axis thereof projecting downward at an angle of less than 60° with respect to the vertical plane for moving the gripper mechanism along the central axis of the fluid-powered cylinder and toward and away from the item; and
a gripper driver for activating the gripper mechanism.

19. The apparatus as defined in claim 18, wherein the gripper mechanism further comprises:

first and second latch jaws each pivotally movable from an open position wherein projecting ends of the latch jaws are spaced apart for defining an open throat for receiving the item, to a closed position wherein the projecting ends of the latch jaws overlap to close about the item.

20. The apparatus as defined in claim 15, further comprising:

sensor means for monitoring the direction and the amount of movement by the sorting conveyor means; and unload signal generating means for generating an unload signal to a respective one of the unloading means in response to the sensor means.

* * * * *